Jan. 21, 1969   L. G. WALLER   3,423,245
DELAYED ACTION BATTERY
Filed April 18, 1966
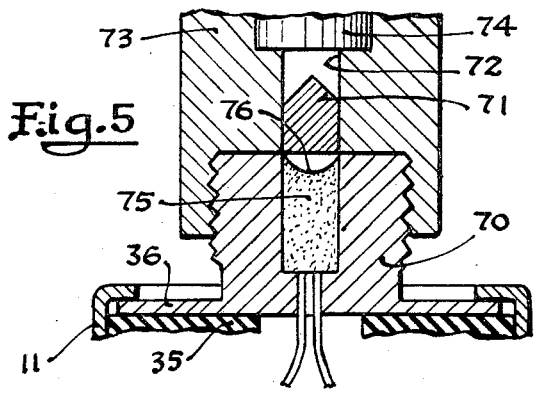
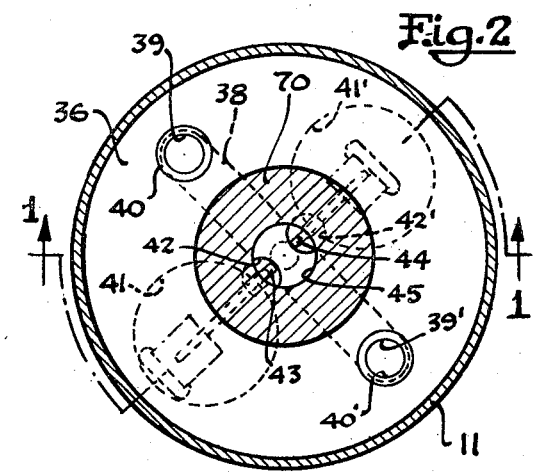
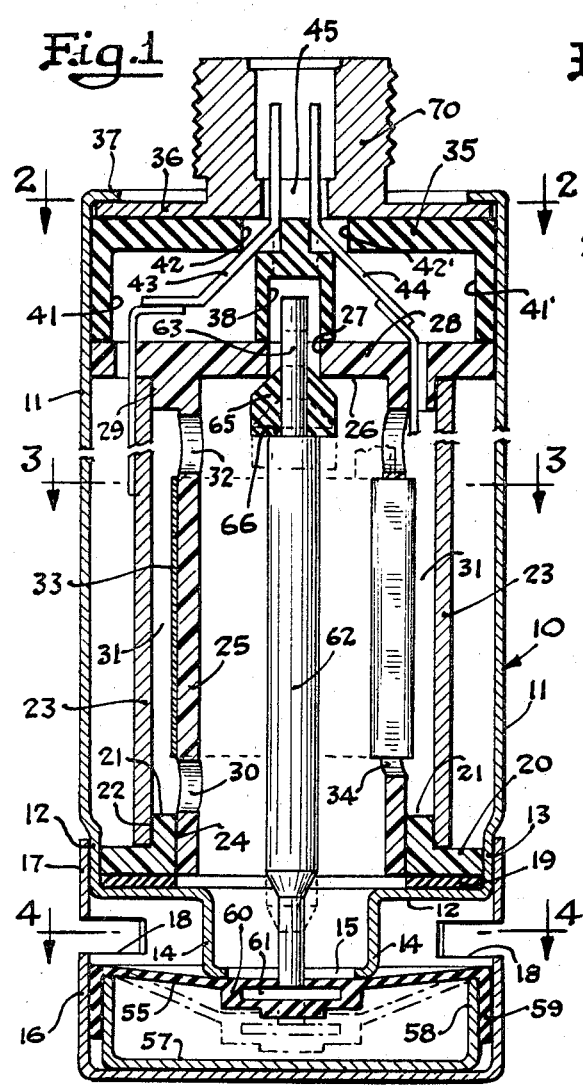
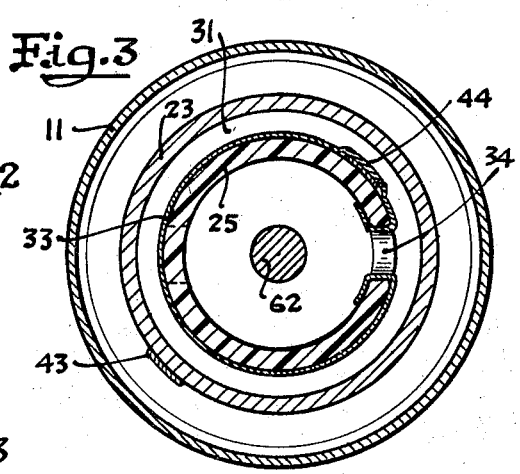
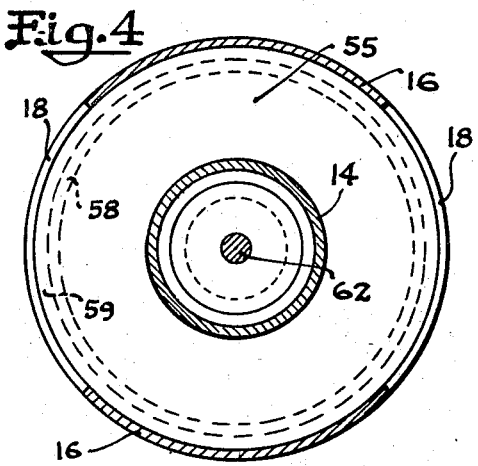
Inventor
Lyle G. Waller
By Hibben, Noyes & Bicknell
Attys

United States Patent Office 3,423,245
Patented Jan. 21, 1969

3,423,245
DELAYED ACTION BATTERY
Lyle G. Waller, Clinton, Ill., assignor to National Union Electric Corporation, Stamford, Conn., a corporation of Delaware
Filed Apr. 18, 1966, Ser. No. 543,387
U.S. Cl. 136—90                3 Claims
Int. Cl. H01m 21/12

The present invention relates generally to a deferred action battery, and more particularly to an improved deferred action primary cell which is adapted to be activated by immersion in a body of aqueous fluid.

Various types of apparatus are designed to be operated by a deferred action battery. Many of these applications are for emergency or survival equipment where a high degree of reliability is essential and where the battery must be ready for instantaneous use by immersion in water after a prolonged period of storage.

Since the most useful type of deferred action battery must be immediately activated when the battery cell is contacted with water without requiring adjustment or removal of parts, and since such batteries are frequently stored for prolonged periods in highly humid atmospheres, it will be evident that a highly desirable quality of a deferred action battery of the instant type is the ability to withstand storage for prolonged periods in a high humidity atmosphere and yet be ready for instant activation without losing its effectiveness and without requiring manual adjustment or removal of protective caps or the like before use.

It is therefore an object of the present invention to provide an improved deferred action battery which can be stored for a prolonged period in a high humidity atmosphere without appreciably reducing the effectiveness of the battery.

It is still another object of the present invention to provide an improved deferred action battery which can be stored for a prolonged period in a high humidity atmosphere without reducing the effectiveness of the battery and which is automatically activated on immersion in water without requiring adjustment or removal of any of the parts thereof.

It is still another object of the present invention to provide an improved deferred action battery which has means for excluding moisture and water from the interior of said battery during storage and which automatically admits water into the interior on immersion in water without requiring manual adjustment or removal of parts to activate the battery.

Other objects of the present invention will be evident to those skilled in the art from the following detailed description and claims when read in conjunction with the accompanying drawing wherein:

FIG. 1 is a vertical sectional view of a deferred action battery of the present invention taken along the line 1—1 of FIG. 2;

FIG. 2 is a horizontal sectional view taken along the line 2—2 of FIG. 1;

FIG. 3 is a horizontal sectional view taken along the line 3—3 of FIG. 1;

FIG. 4 is a horizontal sectional view taken along the line 4—4 of FIG. 1; and

FIG. 5 is a fragmentary vertical sectional view showing a dimple motor operatively mounted on the upper end of the deferred action battery of FIG. 1.

The deferred action battery structure 10 of FIGS. 1–4 of the drawing is comprised of a tubular protective casing 11, preferably of metal but which can be of plastic, having formed on the lower end wall 12 thereof concentric reduced diameter sections 13, 14 extending outwardly axially. A small diameter axial passage 15 is formed in the end wall 12. A cylindrical cap member 16, preferably of metal but which can be of plastic, is mounted on the lower end of the casing 11 with the inner end the cylindrical lateral wall section 17 of the cap member 16 in frictional engagement with the outer lateral wall of the cylindrical section 12 of the casing 11. The lateral wall section 17 of the cap member 16 has one or more slots or passages 18 formed therein which comprise water inlet ports. The interior of the cap 16 contains a novel diaphragm-valve activating means for a delayed action battery.

The tubular casing 11 supports therein the electrodes and other operative components of a delayed action battery. Thus, the inner surface of the end wall 12 of the casing 11 has a sealing spacer or gasket 19 preferably formed of rubber disposed thereon and the gasket 19 supports a nonconductive plastic annular lower spacer ring 20 which fits within the cylindrical section 13 and which has an inwardly axially extending spacer section 21. The outer cylindrical surface 22 of the spacer section 21 frictionally engages the lower end of a tubular section of magnesium 23 which constitutes the anode or negative electrode of the battery, and the inner cylindrical surface 24 of the spacer section 21 frictionally engages the outer surface of a cylindrical nonconductive plastic core member 25. The spacer section 21 of the ring 20 securely holds the lower ends of the tubular section of magnesium 23 and the core member 25 in concentric spaced relationship. The core member 25 has an axial recess 26 extending substantially the length of the said core member 25 and has at the upper or inner end thereof a small diameter axial opening 27.

The cylindrical core member 25 has preferably formed integrally therewith an upper spacer section 28 having a downwardly extending cylindrical surface 29 of the same outer diameter as the spacer section 21. The cylindrical surface 29 frictionally and sealably engages the inner surface of the tubular section of magnesium 23 at the upper end thereof. The core member 25 is provided with one or more lower transverse passages 30 adjacent the lower end thereof which provide a passage for the flow of water from the axial recess 26 into the annular spacer 31 between the magnesium anode 23 and the core member 25. The core member 25 also has adjacent the upper end thereof one or more upper transverse passages 32 extending through the lateral wall surface of the core member 25 to accommodate the flow of fluids between the annular space and the axial recess 26.

Mounted on the outer surface of the core member 25 between the lower and upper transverse passages 30, 32 respectively, is a thin sheet of silver chloride in the form of a generally cylindrical cathode 33 which comprises the positive electrode of the battery. The ends of the sheet of silver chloride forming the cathode 33 are preferably secured to the core member 25 by being folded around the edge of an axially extending slot 34 formed in the cylindrical wall of the core member 25. The silver chloride cathode 33 is of less thickness than the radial distance between the spaced magnesium anode 23 and the core member 25 and thus does not appreciably restrict the flow of fluid through the annular spacer 31.

The upper surface of the spacer section 28 is engaged by cylindrical disc or gasket 35, preferably formed of rubber or other resilient material, which sealably engages the inner lateral walls of the casing 11 and is held in position within the casing 11 by an outer end plate 36 and by the inwardly turned end flange 37 of the casing 11. The gasket 35 has an elongated diametrically extending slot portion 38 in direct communication with the axial opening 27 and a pair of openings 39, 39' at the opposite ends of the said slot portion 38. The openings 39, 39' are aligned with passages 40, 40' respectively, formed in the upper end plate 36 to provide a fluid passage from the interior of the axial recess 26 of the core member 25. The gasket 35 also has diametrically opposite recesses 41, 41' formed in the lower surface thereof on opposite sides of the slot portion 38 with a passage 42, 42' respectively, formed in the upper wall thereof for the electrical conducting leads 43, 44, extending from the anode 23 and cathode 33. The end plate 36 also has an axial passage 45 extending therethrough to accommodate the electrically insulated electrical conducting leads 43, 44.

The end plate 36 preferably has integrally formed therewith an adapter section 70 extending axially therefrom for operatively engaging an auxiliary apparatus which is powered or activated by the delayed action battery 10. For example, an emergency light or a dimple motor can be detachably mounted on the section 70 and operatively connected with the conducting leads 43, 44 of the delayed action battery 10.

In order to prevent deterioration of the electrodes of the delayed action battery during prolonged periods of storage in high humidity atmospheres and at the same time permit the flow of water into the battery automatically without requiring manual adjustment or removal of any parts, a novel valve control means is provided by mounting within the cap member 16 at the lower end of the casing 11 a flexible diaphragm member 55 which extends transversely across the cap member at a point spaced axially below or outwardly of the passage 18 in the cap section 16. The diaphragm member 55 is sufficiently resilient to sealably engage the lower end wall 12 of the casing 11 and sealably close the axial passage 15 against the inflow of moisture or water into the interior of the casing 11. The diaphragm member 55 is held within cap member 16 in the preferred embodiment by providing a rigid inner cup 57 having the lateral walls 58 thereof extending upwardly with the said lateral walls 58 frictionally engaging the annular rim portion 59 of the diaphragm member 55 and fixedly retaining the rim portion 59 against the inner lateral surface of the cap member 16. The diaphragm member 55 is held with sufficient tension and the annular rim portion 59 is disposed at a point axially within said cap member 16 with respect to the end wall 12 to normally urge the outer surface of the diaphragm member 55 into fluid sealing engagement with the lower end wall 14 of the casing 11.

The diaphragm member 55 has a thickened center portion 60 providing an engagement means 61 for operatively engaging an elongated small diameter cylindrical valve stem 62. The valve stem 62 has a length sufficient to extend normally through the passage 27 into the slot portion 38 in the gasket 35. The valve stem section 62 has a reduced diameter upper end section 63 on which is mounted a valve head or disc 65 with the valve disc 65 abutting a shoulder 66 on the valve stem 62 in order to prevent downward axial movement of the valve disc 65. The valve disc 65 is so proportioned as to sealably close the axial opening 27 in the spacer section 28 when the diaphragm member 55 sealably closes the axial passage 15 in the lower end wall 12 of the casing 11.

In operating the foregoing battery structure it will be evident that the diaphragm member 55 normally sealably closes the passage 15 in the lower end wall 12 of the casing 11 and the valve disc 65 simultaneously sealably closes the axial opening 27 in the spacer section 28, thereby preventing the entry of moisture or water into the interior of the battery while the battery is in storage or standby condition. When the battery is immersed in water, however, the water entering through the passage 18 depresses the flexible diaphragm member 55 to the dotted line position shown in FIG. 1 and allows water to flow inwardly through the passage 15 into the axial recess 26 of the core member 25. The water then flows through the lower fluid passage 30 in the core member 25 into the annular space 31 between the electrodes and upwardly and outwardly through the upper transverse passage 32 in the core member 25, then through opening 27 and outwardly to the surrounding atmosphere through the passages 39, 39' in the gasket 35 and through the openings 40, 40' in end plate 36. As the water flows into the battery in the foregoing manner air normally within the battery will be forced upwardly and outwardly through the passages in the upper end of the delayed action battery. When the water enters the annular passage between the electrodes the battery is activated and electric current flows through the electrical conductor leads 43, 44 and actuate the auxiliary apparatus associated with the delayed action battery, such as electric light or squib.

In FIG. 5 a dimple motor 70 is shown in the unfired position mounted on the upper end section 70 of the battery end plate 36. A firing pin 71 engages the upper surface of the dimple motor 75 with the firing pin 71 disposed in a guide passage 72 formed in an adapter member 73 of the auxiliary apparatus having, for example, a frangible carbon-dioxide cartridge 74 disposed adjacent the end of the firing pin 71. The frangible carbon-dioxide cartridge 74 when broken by the firing pin 71 is adapted to release sufficient carbon-dioxide to inflate a life jacket or life raft. When the battery 10 is actuated by immersing in water in the above described manner, the recess hemispherical flexible upper surface 76 of the dimple motor 75 is rapidly forced upwardly into the shape of a dimple when the explosive charge contained within the motor is ignited by the electric current flowing from the battery 10. The firing pin 71 is then rapidly propelled into contact with the frangible carbon-dioxide cartridge 74 to release the enclosed carbon-dioxide. Dimple motors of the foregoing type can also be used to open and close permanently an electrical switch or actuate other apparatus and is preferred over a regular squib which leaves a quantity of ash in the firing cavity and associated apparatus after ignition and requires thoroughly cleaning the cavity and associated apparatus before insertion of a new battery and squib.

While in the preferred embodiment of the present invention the magnesium tubular member is the outer electrode, it is possible to reverse the electrodes and make the inner electrode of magnesium and have the silver chloride as the outer electrode. Also, other combinations of metals or compositions can be used to provide the electrochemical reaction which will produce the required electrical energy during the discharge of the battery, as those skilled in the art will readily understand. And, if desired, the core member can also be made out of a conductive material which does not take part in the electrochemical reaction. It should also be evident that the tubular elements of the battery need not be circular in cross-section, but can have any desired tubular form and still function in the herein described manner.

Others may practice the invention in any of the numerous ways which are suggested to one skilled in the art by this disclosure, and all such practice of invention are considered to be a part hereof which fall within the scope of the appended claims.

I claim:

1. In a deferred action battery adapted for activation by immersion in a body of aqueous liquid and having an outer electrode disposed within a protective casing and an inner electrode disposed in spaced coaxial relationship within said outer electrode, said electrodes having a fluid passageway therebetween adapted to receive aqueous liquid therein for effecting activation thereof, upper and lower end closure means at the opposite ends of said casing with upper and lower fluid passages extending through said upper and lower end closure means, respectively, the improvement in combination therewith comprising; a cap member enclosing said lower fluid passage, said cap member having a fluid passage in a wall thereof, a flexible diaphragm member mounted within said cap member sealably closing said lower-fluid passage and being moveable out of sealable engagement with said lower fluid passage by the pressure of water entering the fluid passage in said cap member, said diaphragm member having means for operatively supporting a valve stem member to effect reciprocable movement of said valve stem member, a valve head mounted on said valve stem member normally adapted to sealably close a fluid passage between said passageway and said upper fluid passage of said upper end closure means when said diaphragm member sealably closes said lower fluid passage and moveable to permit the flow of fluid between said upper fluid passage and said fluid passageway when said diaphragm member is moved out of sealing engagement with said lower fluid passage.

2. A deferred action battery as in claim 1, wherein said fluid passage in said lower end closure means is axially disposed therein and said diaphragm member is mounted transversely within said cap member outwardly of said fluid passage in said cap member with said diaphragm member supporting said valve stem member for reciprocable axial movement within said axial passage defined by a core member which is axially disposed in said casing and which closes said upper end of said passageway, said fluid passage between said passageway and said upper fluid passage being formed in the upper wall of said core member, and said valve head mounted on said valve stem sealably closing said fluid passage in the upper wall of said core member.

3. In a deferred action battery adapted for activation by immersion in a body of aqueous liquid and having an outer tubular electrode disposed within a protective casing and an inner tubular electrode disposed in spaced coaxial relationship within said outer tubular electrode, said electrodes having an annular fluid passageway therebetween adapted to receive aqueous liquid therein to activate said battery, a core member coaxially disposed with said inner electrode and having a greater length than said inner electrode with an axial recess formed therein, said core member having upper and lower transverse passages therethrough in communication with the opposite ends of said annular fluid passageway, nonconductive spacer means which maintain said electrodes in spaced relationship and which close the opposite ends of said annular passageway, upper and lower end closure means at the opposite ends of said casing with upper and lower fluid passage means extending through the said upper and lower end closure means, respectively, and said upper fluid passage communicating with said annular fluid passageway through a fluid passage in the upper end of said core member, the improvement in combination therewith comprising; a lower cap member mounted on the lower end of said casing and enclosing said lower fluid passage which is disposed axially in said casing, said lower cap member having a fluid passage formed in the lateral wall thereof intermediate the ends thereof, a flexible diaphragm mounted transversely within said cap member outwardly of said fluid passage and sealably closing said lower fluid passage and moveable axially out of sealable engagement with said lower fluid passage by the pressure of water entering said cap through the said passage in the wall thereof, said diaphragm member having means for operatively supporting a valve stem member for reciprocable axial movement in said recess of said core member, a valve head mounted on said valve stem member sealably closing said fluid passage formed in the upper end of said core member when said diaphragm sealably closes said axial passage in said lower end closure means and moveable axially to permit the flow of fluid through said fluid passage in said core member when said diaphragm is moved out of sealing engagement with said axial passage in said lower end closure means.

References Cited

UNITED STATES PATENTS 3,326,724   6/1967   Armitage.

WINSTON A. DOUGLAS, *Primary Examiner.*

A. SKAPARS, *Assistant Examiner.*

U.S. Cl. X.R.

136—83, 100